United States Patent Office 3,687,775
Patented Aug. 29, 1972

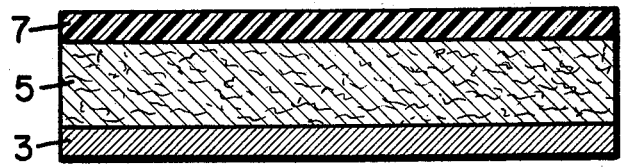
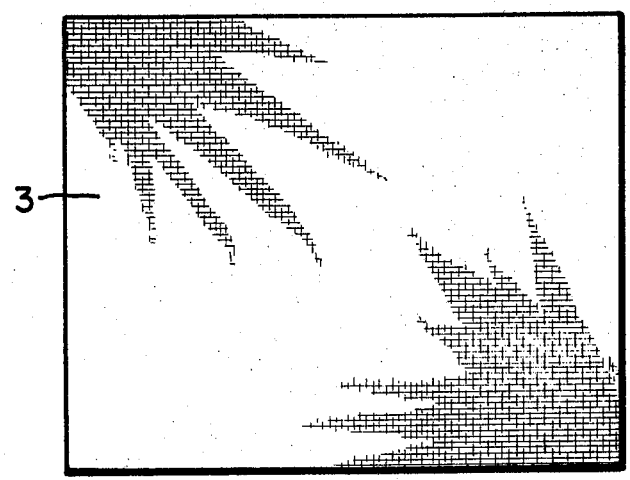

3,687,775
PROCESS FOR PRODUCING PLIABLE AIR PERMEABLE LAMINAR MATERIAL
Gyorgy Szabo and Sandor Toth, Gyor, Hungary, assignors to Licencia Talalmanyokat Ertekesito Vallalat, Budapest, Hungary
Filed Dec. 13, 1968, Ser. No. 783,541
Claims priority, application Hungary, Dec. 16, 1967, 5A–1838
Int. Cl. C09j 7/04
U.S. Cl. 156—306       2 Claims

ABSTRACT OF THE DISCLOSURE

A method of producing a pliable laminar material, such as artificial leather, by providing a woven fabric carrier which may be made, for example, of polyamide and cotton, and then forming on the surface of the carrier a fiber layer containing polyamide and other fibers, said fibers being added to the surface of the carrier, or being formed from the carrier, and then compressing and heating the surface layer to melt only the polyamide at the surface to form a film on the surface.

---

The invention relates to a pliable laminar material, particularly to synthetic leather, and to a process for its production.

It is common knowledge that the so-called synthetic leather is in ever increasing demand throughout the world. Synthetic leather can no longer be considered simply a substitute material, since different purposes require materials of different properties. Owing to the wide variety of uses, both natural and synthetic leather have become irreplaceable raw materials in various fields of industry.

With the growth of the synthetics industry various synthetic products have been developed, the basic starting material of which successfully competes with natural leather as regards both physical strength and chemical resistance. The basic material of the known synthetic leathers generally consists in a textile carrier which may be woven or non-woven. Surface film systems are applied on such textiles as a base in the course of manufacturing the synthetic leather.

The synthetic leathers thus produced are competitive with natural leather in certain domains, and are more widely used for manufacturing certain products than natural leathers, since they are less expensive and some of their properties make them more appropriate for special fields of use. The synthetic leathers so far developed, however, cannot satisfy the requirements of industry, either as to their appearance or their properties.

Earlier, the main requirements were directed to synthetic leathers highly resembling both in appearance and touch to natural leather. Accordingly, it was considered a primary requirement that the appearance and structure of synthetic leather be reminiscent of natural leather. At present, however, requirements have shifted from appearance towards quality, such as processability, so that nowadays synthetic leathers are expected to have properties which in some respects surpass those of natural leather. Up-to-date synthetic leathers must preserve all advantageous properties of natural leather, while being free of most of their disadvantages.

One of the most important and essential steps in the manufacture of synthetic leathers consists in forming a surface film system on a textile carrier. The surface film systems so formed may have different structures; the range of surface films required in the manufacture of synthetic leathers extends from completely compact films to micro-heteroporous film systems.

The technology of the most important conventional methods is summarised below as follows:

(a) The surface film system is prepared from a solution in such a manner that the solution is applied on a carrier and the solvent is evaporated. The solvent may be water or an organic solvent. This method is mainly used for producing compact films. Its major drawback is that it requires the evaporation of a large quantity of solvent.

(b) The surface film system is prepared from the dispersion of a macromolecular substance made with a softener in such a manner that the dispersion is applied to a carrier and subsequently it is heat-treated. In this case there is no need of evaporating the dispersing medium. This method is mainly applied when preparing PVC synthetic uppers on a textile base. This method has the short-coming of lending itself solely for making compact films.

(c) The surface film system is prepared from the aqueous emulsion of a macromolecular substance in such a manner that water is removed by heat from the emulsion applied on the carrier.

This method permits to prepare not only compact films but also films with a limited porosity. It has the disadvantage, however, that the porosity and other properties may be changed within a narrow range only.

(d) The surface film system is prepared by precipitating the macromolecular substance on the carrier from a solution in an organic solvent.

This method is mainly suitable for preparing micro-heteroporous surface film systems. It has the disadvantage of requiring exceedingly large quantities of organic solvent, and the manufacturing technology must be observed with the utmost precision.

(e) To a solution of the basic substance in an organic solvent, or into its aqueous dispersion, a fine granular component apt to be dissolved in water or in the solvent is admixed. Thereafter the film is formed on the textile carrier by heat-treating the solution or dispersion applied on said carrier, and the finely granular component is subsequently removed by dissolution.

This method has the disadvantage of necessitating a separate step for dissolving the finely granular component which ensures porosity, so that the film thus prepared is of coarse porosity.

(f) A blowing agent is admixed to the solvent or dispersion from which the film system is to be prepared, whereby at a certain temperature a gaseous product is obtained. The film system so obtained will have either closed pores, or closed as well as open pores. This method is used e.g. for preparing foamed PVC synthetic shoe uppers.

The process has the disadvantage that the surface system so obtained is neither microporous nor heteroporous.

(g) According to one of the most recent processes for producing surface film systems a thermoplastic material applied in powdered or granular form is melted on the carrier, and the surface of the melt is pressed to give the desired grained effect.

This process is also not suitable for producing a micro-heteroporous film system.

It follows from what has been said above that a number of methods have been employed for producing surface films with a compact or porous structure. It is a common deficiency of all these processes that none of them is capable to satisfactorily achieve the preparation of micro-heteroporous surface film systems, although recent researches have shown that micro-heteroporosity is an essential property of synthetic sheet materials.

Another common deficiency of the known processes is that they require the installation of intricate equipments, and their manufacturing technology comprises various costly operations.

While the known processes permit to achieve a certain degree of air and vapour permeability, yet so far this property could only be realized at the expense of other desired properties of the product, such as breaking strength, resistance to wear and abrasion or scuffing, and the operations required to this end were costly and labour-consuming.

Accordingly, no process has been known hitherto permitting to produce in a simple and inexpensive manner products of properties adapted to the intended field of use and of appropriate air and vapour permeability.

It is the object of the invention to ensure a product satisfying practically all the above requirements.

This and other objects of the invention will become more apparent from a consideration of the following disclosure, taken in connection with the accompanying drawing, in which:

FIG. 1 is a cross-sectional view of material according to the present invention; and FIG. 2 is a bottom plan view of the material of FIG. 1.

The invention is based on the discovery that by melting the surface of a fibre layer consisting of a mixture of thermoplastic and non-thermoplastic structural fibres, it is possible to obtain a surface film system in which the non-thermoplastic structural fibres create channels and ensure the porosity of the surface film stratum. The term fibre layer is used here to denote a randomly aggregate of non-woven structural fibres.

The invention is moreover based on the discovery that if the surface film system is produced by melting the surface of a fibre layer formed on a carrier, a pliable laminar material is obtained, the porosity of which may be optionally varied.

The invention accordingly relates to a pliable laminar material 1 as shown in the drawing which essentially comprises a carrier 3, a fibre layer 5 composed of fibres consisting of the material of the said carrier itself or fibres applied on the surface of the said carrier, and a film 7 formed by melting the outer surface of the said fibre layer.

The invention moreover relates to a process for producing a pliable laminar material comprising the steps of forming on the surface of a carrier a fibre layer, at least 20% of which consists of thermoplastic fibres, and, if desired, applying a thermoplastic synthetic material on the said fibre layer in the form of a solution, dispersion or powder, then melting the outer surface of said fibre layer and the said synthetic material, which may have been applied on it, by heating, thereby forming an outer film, compacting the system so obtained by compression and, if desired, providing the said outer film with a pattern.

It is advisable to form the fibre layer on the surface of the carrier by napping the material of the carrier or by forming loops of it. In the event of loop-formation the fibre layer is preferably produced by cutting the loops open. It is, however, also possible to apply on the surface of the carrier a binding agent, and subsequently electrostatically applying on it structural fibres corresponding to the desired composition of the fibre layer.

The melting of the fibre layer is conveniently performed with heat-conveying means, preferably a calender, having a temperature exceeding the melting point of the thermoplastic fibres by at least 5° C. The desired pattern may be applied on the surface preferably by means of the said heat-conveying means, for example calender.

In conformity with an advantageous embodiment of the process according to the invention the fibre layer is formed from fibres having different melting points, and the temperature of the heat-conveying means employed for melting is adjusted in accordance with the melting point of the fibre having the lowest melting point.

By an appropriate choice of the composition of the fibre layer formed on the surface of the carrier, the process according to the invention permits to produce a film system having a desired porosity, between that of a compact film and of a micro-heteroporous film. The product so prepared possesses all the favourable properties of the known synthetic leathers, but surpasses these in regard to air permeability (breathing), wear-resistance and strength, while at the same time these properties may be varied in conformity with the desired fields of use.

The structure of the pliable laminar material according to the invention is influenced not only by the relative ratio of thermoplastic and non-thermoplastic fibres, but also by the temperature and pressure applied.

If the fibre layer is formed on the surface of carrier from different thermoplastic fibres having different melting points, then an appropriate choice of the temperature and pressure applied will render possible to adjust the extent of porosity and the size of pores in conformity with requirements.

If the fibre layer is composed of a mixture of thermoplastic and non-thermoplastic fibres, the process according to the invention permits to produce a heteroporous film system in which the non-thermoplastic fibres form the channels corresponding to the pores running across the film.

By varying the structure of the fabric used as a carrier, it becomes possible to change mainly the strength properties of the finished product. The variations of the known kinds of weave permit to impart to the carrier physical and mechanical properties best suited to the intended field of use, whereby the range of application may be further extended.

The laminar material produced is ready for use without any subsequent treatment, yet treatments, such as hydrophobisation, will improve its properties. It is furthermore suitable to be united with textile carriers, such as felt, fleece or the like, for example by glueing. In this manner novel products are obtained, exhibiting advantageous properties both on their reverse and face sides.

Of the various advantages to be accomplished by means of the process and product according to the invention, the following are listed with special emphasis:

(a) The process is both simple and economic, and no special skill is needed for putting it into practice.

(b) By means of an appropriate choice of the physical and chemical properties of the structural fibres of which the fibre layer is formed, the type of yarn, the kind of weave and the weight per square meters of the fabric serving as carrier, of the thickness of the fibre layer, also of the conditions, such as temperature, pressure and speed, under which the fibre layer is molten, the quality of the finished product can be varied within a wide range.

(c) The properties of the finished product, such as air and vapour permeability, wear resistance and strength may be varied as desired so as to conform to the intended field of use.

(d) Any of the conventional modes of processing usual in the art of confection, e.g. sewing, stamping, cutting, stitching or glueing, may be employed for converting the finished product into clothing, foot-wear upholstery, or leather goods, for all purposes for which hitherto natural or artificial leather had been employed.

(e) The product is ready for use without any subsequent treatment, but its properties may be further varied by applying any of the known film-forming methods; thus e.g. by applying a thin surface film separated from a solvent or emulsion medium onto the already formed film system, the initial favourable properties of the original product may be further improved.

The following examples will serve to illustrate the invention by means of some preferable embodiments but are not to be regarded as limiting it in any way.

EXAMPLE 1

An 8-yarn fabric in sateen is prepared, the set of warp consisting of Nm. 50/2 cotton yarn, and the weft consisting of Nm. 50/2 polyamide 6, with a density of warp of 240 per 10 cm. and a number of picks of 380 per 10 cm. (360 twists per meter), the fabric is napped by the usual napping machine, thereafter the naps are sheared to a length in the range of 0.5–2 mm.

The pile face of the fabric thus produced is heat-treated by drawing the fabric at a rate of 10 m. per minute between calender rollers while applying a pressure of 200 g. per sq. cm. The surface of the roller which is contacted with the pile face of the fabric is coated with a substance repelling the polyamide melt, e.g. with silicon oil ,and heated to approximately 240° C.

In this manner a film system is formed on the pile face which is micro-heteroporous, of excellent vapour-permeability, resistant to continual folding and highly marproof.

EXAMPLE 2

One proceeds as in Example 1, with the difference, however, of using a fabric, the weft of which consists of 67% of polyamide 6 and 33% of cotton yarn. Onto the surface film stratum so formed a polyurethane film is applied by spraying, then the face is grained to have a chrome-side like appearance.

The external surface of the product so obtained is completely hydrophobic, whereas the fabric side exhibits good vapour and steam permeability.

EXAMPLE 3

One proceeds as in Example 2, but a fleece is applied on the fabric side by means of a polyurethane glue.

The product so obtained has high vapour permeability, resistance to folding, it is wear-proof, durable, and well suited for use as shoe uppers.

EXAMPLE 4

A fabric is prepared from Nm. 60/2 cotton yarn with a set of warp of 260/10 cm., and using as weft a Nm 50/2 cotton yarn, and a Nm. 50/2 mixture (containing polyamide 6 and cotton in a ratio of 67 to 33) with a weft density of 380/10 cm. The fabric is made in plain weave with a doublet weft woven in the sequence of 2 shoots of plain weave plus 2 shoots of doublet weft. On the face of the fabric a fibre layer is produced in the manner described in Example 1, whereafter a surface film stratum is prepared also in the way as described in Example 1.

The product so obtained is rendered hydrophobic by means of some conventional finishing method.

Due to its plain weave base, the product exhibits high mechanical strength and is suitable for use in high-strain fields of use.

EXAMPLE 5

One proceeds as described in Example 4, with the difference, however, of applying a thin polyamide film (approximately 10 to 15 microns) onto the surface film without hydrophobization.

Besides good steam-permeability, the product exhibits high mechanical strength and resistance to wear.

We claim:

1. A process for producing a pliable air and vapor permeable laminar material, comprising the steps of forming on one surface of a woven fabric carrier a nonwoven fiber layer of loose-ended fibers at least 20% of which consists of thermoplastic polyamide fibers, said thermoplastic polyamide fibers in said layer being in admixture with other loose-ended fibers in said layer, heating only said layer to a temperature sufficient to melt said thermoplastic polyamide fibers but not said other fibers, and compacting the material with the partially melted surface so obtained by compression thereby to produce a pliable air and vapor permeable laminar material having a woven fabric carrier and an integral surface layer of fused thermoplastic material traversed by said other fibers.

2. A proces as claimed in claim 1, in which said other fibers are cotton.

References Cited

UNITED STATES PATENTS

| | | | |
|---|---|---|---|
| 2,715,588 | 8/1955 | Graham | 161—151 |
| 3,186,897 | 6/1965 | Hochberg | 161—150 |
| 3,245,863 | 4/1966 | Sonnichsen et al. | 161—DIG 2 |
| 3,284,274 | 11/1966 | Hulsander et al. | 161—DIG 2 |
| 3,387,989 | 6/1968 | West et al. | 161—DIG 2 |
| 3,399,102 | 8/1968 | Matsushita et al. | 161—DIG 2 |
| 3,436,298 | 4/1969 | Oppenlander et al. | 156—306 |
| 3,494,819 | 2/1970 | McAlister | 161—150 |
| 3,501,369 | 3/1970 | Drelich et al. | 161—150 |
| 3,523,861 | 8/1970 | Newman et al. | 156—306 |

REUBEN EPSTEIN, Primary Examiner

U.S. Cl. X.R.

161—150, 151; 156—279, 61